(12) United States Patent
Hammill et al.

(10) Patent No.: US 6,173,178 B1
(45) Date of Patent: Jan. 9, 2001

(54) SATELLITE BEAM PATTERN FOR NON-UNIFORM POPULATION DISTRIBUTION

(75) Inventors: Chet W. Hammill, Los Angeles; Karl O. Dishaw, Lompoc, both of CA (US)

(73) Assignee: TRW Inc., Redondo Beach, FL (US)

(*) Notice: Under 35 U.S.C. 154(b), the term of this patent shall be extended for 0 days.

(21) Appl. No.: 08/991,080

(22) Filed: Dec. 16, 1997

(51) Int. Cl.[7] ............................................. H04Q 7/36
(52) U.S. Cl. ................... 455/429; 455/427; 455/444; 455/449; 455/446; 455/443; 455/13.1; 455/12.1; 455/13.3
(58) Field of Search ................................. 455/427, 429, 455/444, 449, 446, 443, 13.3, 12.2, 13.2

(56) References Cited

U.S. PATENT DOCUMENTS

| | | | |
|---|---|---|---|
| 4,931,802 | * 6/1990 | Assal et al. | 455/12.1 |
| 5,408,237 | * 4/1995 | Patterson et al. | 455/429 |
| 5,736,959 | * 4/1998 | Patterson et al. | 455/13.3 |
| 5,812,538 | * 9/1998 | Wiedeman et al. | 455/12.1 |

\* cited by examiner

Primary Examiner—Fan Tsang
Assistant Examiner—Keith Ferguson
(74) Attorney, Agent, or Firm—Lorna L. Schott

(57) ABSTRACT

A method of generating a beam pattern (202) covering a region of interest (100) is disclosed. The method includes generating a first set of beams having a first size (204). Each beam occupies a portion of the frequency spectrum which need not be unique among the first set of beams. A second set of beams is also generated. Each of the second set of beams has a second size (206) and each of said second set of beams also occupies a portion of the frequency spectrum which need not be unique among the first or second set of beams. The first set of beams and said second set of beams are projected onto a region of interest to create a beam pattern (202). The projected beams need not fall on a regular grid or adhere to any other regular pattern. Each of the projected beams in the beam pattern is substantially non-interfering with any adjacent projected beam.

14 Claims, 14 Drawing Sheets

SATELLITE BEAM PATTERN FOR NON-UNIFORM POPULATION DISTRIBUTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to satellite beam patterns. In particular, the present invention relates to overlapping beam patterns that support the bandwidth requirements of non-uniform population distributions.

Satellites carry antennae that provide communications bandwidth between the satellite and a region of interest (ROI). The ROI, for example, may include the entire United States, or any other selected portion of the Earth. Because many ROIs, including the United States, have a non-uniform population distribution, it is often the case that areas of a particular size within the ROI have much greater bandwidth requirements than equal sized areas elsewhere within the ROI.

In the past, however, satellite antennae have either produced a single beam which covers an entire ROI, or have produced a set of equal sized beams laid out on a regular grid pattern to cover the ROI. The past approaches to beam coverage have a number of undesirable characteristics. First, the bandwidth provided by the beam coverage may not be adequate for areas of high bandwidth demand (generally corresponding to areas of high population density). Thus, suppliers of communications services, for example, Internet service providers or cable TV operators in a particular Nielsen region, cannot establish accounts with consumers who might be willing to pay for those services. Similarly, the bandwidth provided by the beam coverage may greatly exceed the bandwidth need in sparsely populated regions. As a result, bandwidth which may be needed elsewhere is wasted.

Furthermore, when a grid pattern is used, the portion of the frequency spectrum (typically selected from the K or C frequency bands) occupied by the beams simply alternates across the grid. As a result, prior beam patterns required transmitting the same information on several beams to cover a wide area. For example, in the West, a particular market region may be much larger than a single beam. The same information must, therefore, be transmitted on several beams that cover the market region. As a result, the amount of bandwidth provided in a grid pattern may be more than twice the amount actually necessary to support the total bandwidth demand.

The inability of prior antenna to produce efficient beam coverage for non-uniform populations is a result of beam pattern design tradeoffs including antenna size, coverage area, and power limitations. Production of smaller, tightly focused beams for densely populated areas, sometimes referred to as spot beams, requires a very large antenna. Very large antennas, in turn, are expensive to manufacture and launch, and require more power during operation the most conventional satellites can generate. On the other hand, a smaller antenna may be used to produce a larger beam, but the larger beam cannot focus its bandwidth on a small area of high bandwidth demand.

As a result, it is desirable to project a beam pattern on the ROI which uses numerous beams of various sizes to provide the appropriate bandwidth for each area in the ROI. In other words, a set a tightly focused beams (referred to as "spot beams") might be directed towards areas of high bandwidth density, while a smaller set (or even a single beam) of less tightly focused beams might be appropriate for a much larger area with a lower bandwidth demand (for example, some of the sparsely populated Western states). Directing the appropriate amount of bandwidth to the appropriate areas results in less expensive, more efficient, and less complex beam pattern coverage. Appropriate beam pattern coverage also tends to create more communications services available at a lower cost to more individuals.

Therefore, a need remains for improved antenna beam patterns which overcome the disadvantages discussed above and previously experienced.

BRIEF SUMMARY OF THE INVENTION

It is therefore an object of the present invention to provide antenna beam pattern coverage for a ROI with a non-uniform population distribution.

It is another object of the present invention to provide spot beams for areas of relatively high bandwidth demand while providing wider beams for areas of relatively low bandwidth demand.

It is another object of the present invention to provide the bandwidth requirements for a ROI with fewer beams.

It is yet another object of the present invention to provide beam pattern coverage that is not constrained to a regular grid pattern.

It is another object of the present invention to provide overlapping beams of differing sizes to cover a ROI of non-uniform population distribution.

The present invention is directed toward a method for providing antenna beam pattern coverage for a region of interest having a non-uniform population distribution. At least one first set of beams is generated. Each of the first beams shares a common size that determines the area of coverage for each of the first beams when projected onto the ROI. Each of the beams in the first set of beams is allocated a portion of the electromagnetic spectrum which need not be unique among each of the beams in the first set of beams. For example, a portion of the frequency spectrum 1 GHz in width may be divided into six portions approximately 166 MHz wide and each portion may then be reused among the beams in the first set of beams.

At least one set of second beams is also generated. In the same fashion as the first beams, each of the second beams shares a common size that determines the area of coverage for each of the second beams when projected onto the ROI. Each of the beams in the second set of beams is allocated a portion of the electromagnetic spectrum which need not be unique among each of the beams in the second set of beams. For example, a portion of the frequency spectrum 1 GHz in width may be divided into six portions approximately 166 MHz wide and each portion may then be reused among the beams in the second set of beams.

In order to provide coverage for the ROI, the first and second beams are projected, for example, by a satellite antenna, onto the region of interest. The projection of the beams is arranged such that each of the first beams and each of the second beams is substantially non-interfering with any adjacent beam. In other words, the projection is designed initially so that where any two beams may overlap, those two beams occupy unique portions of the electromagnetic spectrum and are therefore non-interfering.

In additional to assigning unique portions of the electromagnetic spectrum to beams, the invention also comprehends creating polarized beams. Two beams occupying the same unique portion of the electromagnetic spectrum may then overlap without interfering, provided that the polarizations on the overlapping beams are opposite or otherwise non-interfering.

DETAILED DESCRIPTION OF THE INVENTION

Figure 1:
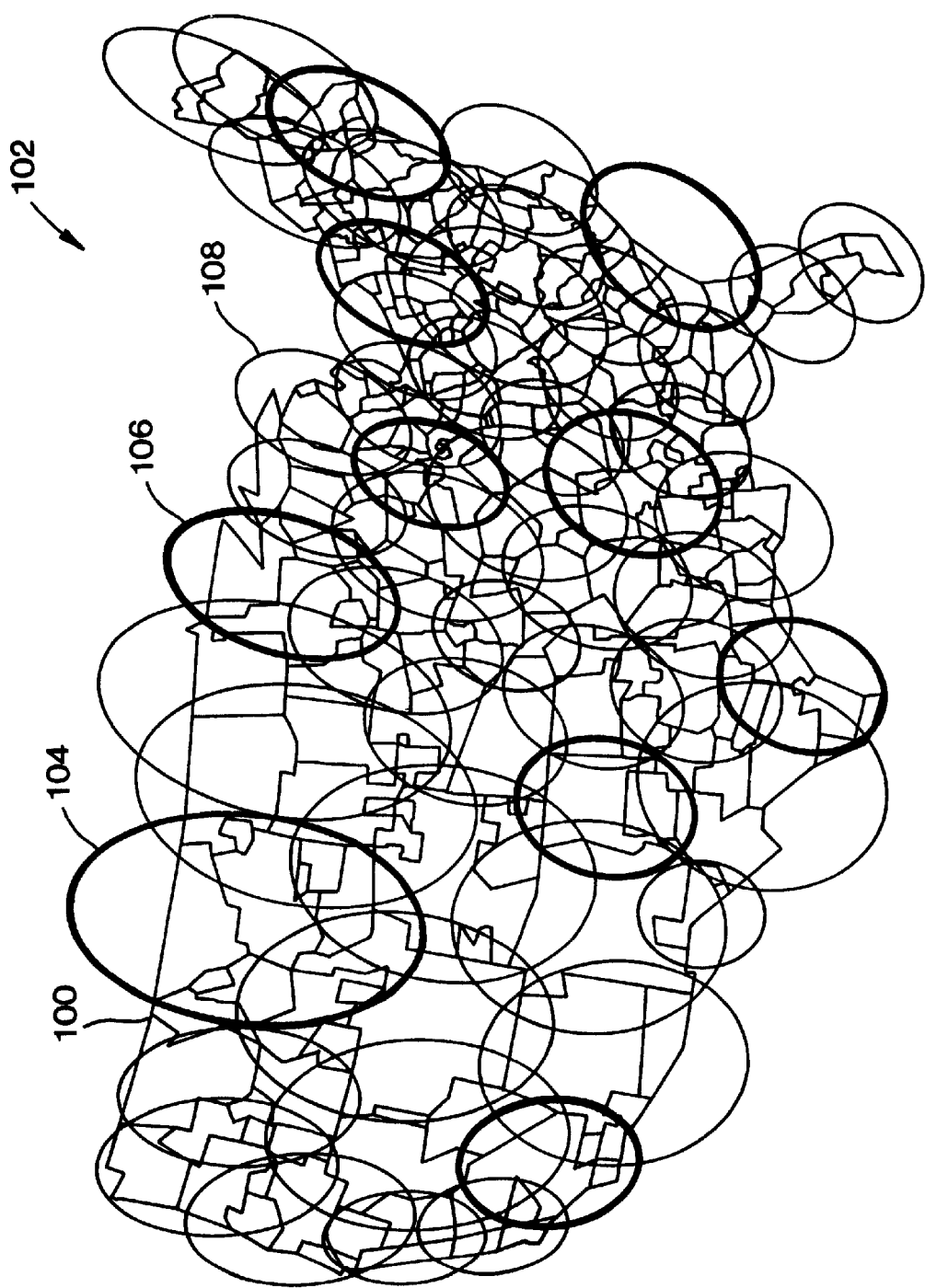
FIG. 1 illustrates a projection of beams of three different sizes, two polarizations, and six different frequencies that provides communication bandwidth across the United States.

Turning now to FIG. 1, a map of the continental United States 100 is shown covered by a projection of overlapping beams 102 of a first size 104, a second size 106, and a third size 108. It is noted that Alaska an d Hawaii may be covered as well with additional beams. As shown in FIG. 1, the satellite uses beams of three different sizes, two polarizations, and six different frequencies to provide communication bandwidth across the United States. In a preferred embodiment, each of the beams is allocated bandwidth from the Ka frequency band. The Ka frequency band is located at approximately 30–35 GHz. Preferably, a 1 GHz wide portion of the Ka band is subdivided in frequency and distributed among several satellite antenna to provide non-interfering transmit or receive channels. For example, six antennae may be used, each assigned to and operating over a unique bandwidth of approximately 166 MHz. Each of the antennae may in turn transmit or receive multiple beams at the assigned frequency, and each beam may be further subdivided in time or frequency to handle, for example, multiple television stations. In one embodiment of the present invention, each beam supports up to 36 television stations. Each of the beams may also include a polarization, typically implemented as clockwise or counter clockwise polarization. Two beams of the same frequency may overlap each other without interference provided that they are distinguished by their polarization.

Although one common scenario is the use of a satellite to generate the beams shown in FIG. 1, the beams may also be generated, for example, by ground stations that transmit the beams to a satellite. In a preferred embodiment, the satellite uses a series of MBA (Multiple Beam Array) antennae to generate the beams. For example, a satellite may carry six antenna, each designed to transmit or receive multiple beams at a particular 166 MHz bandwidth assigned from the Ka band. A phased array antenna may also be used to generate the beams, and also provides the ability to reconfigure the antenna on the fly to transmit beams of varying sizes. FIGS. 2–7 illustrate the beams of various frequencies and polarizations constituting the projection shown in FIG. 1.

Figure 2:
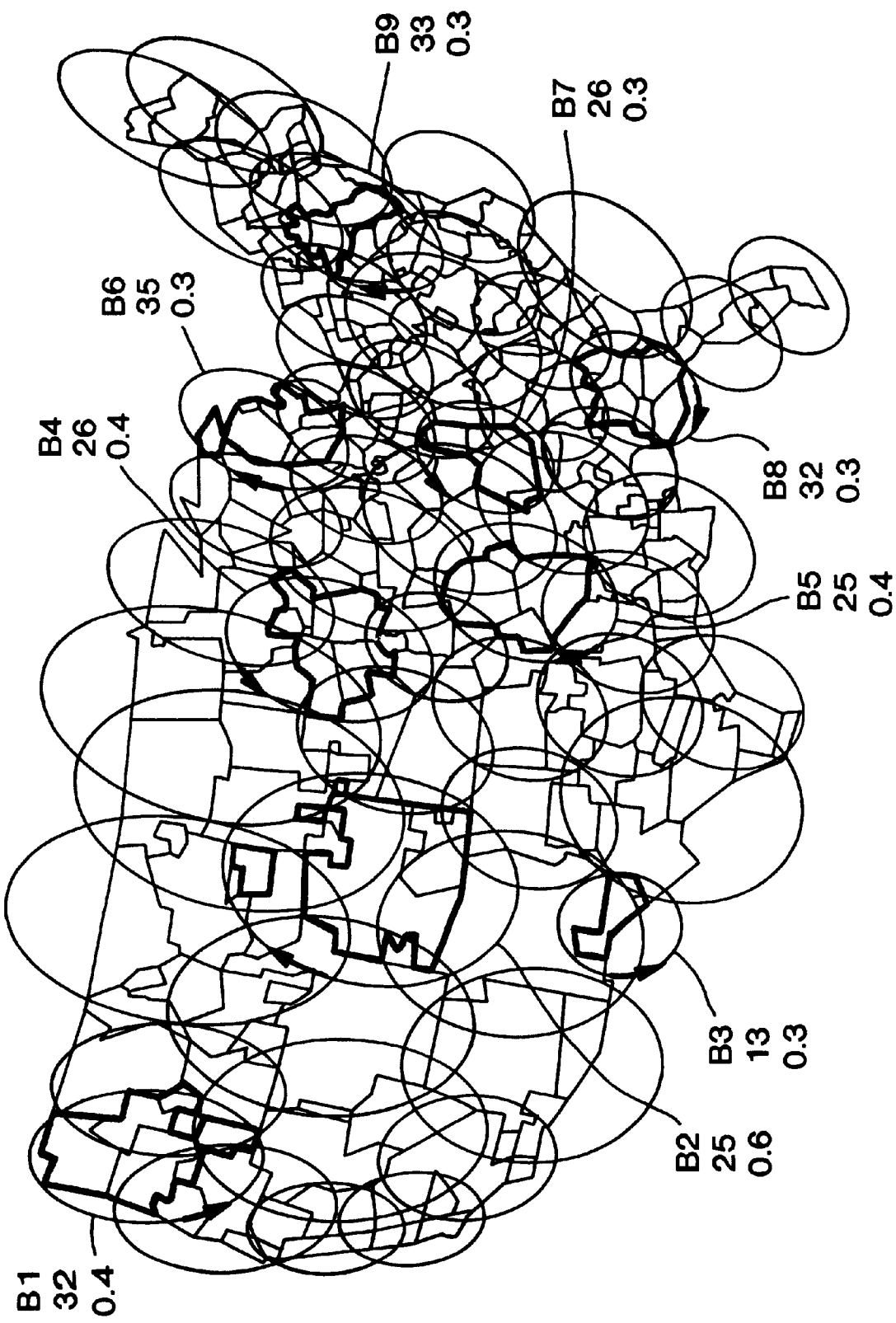
FIG. 2 shows the projection of a subset of beams shown in FIG. 1 that represents a particular frequency, labeled 'B'.

FIG. 2 shows a subset of the beams shown in FIG. 1 that are labeled B1–B9. Each of the labeled beams provides communications bandwidth over approximately the same frequency range, preferably a subset of the Ka frequency band. Beams of three different sizes exist in FIG. 2. Beams B1, B4, and B5 have an approximately 0.4 degrees half angle, beam B2 has an approximately 0.6 degrees half angle, and beams B3, B6, B7, B8, and B9 have an approximately 0.3 degrees half angle. A beam with a larger half angle covers a larger area when projected onto the region of interest (ROI). The half angles shown in FIG. 2 are illustrative only; a ROI may be covered with beams having many other sizes.

Each of the beams shown in FIG. 2 has a polarization indicated by an arrow on the beam outline. Beams B1, B3, B4, and B7 have counter clockwise polarization, while beams B2, B5, B6, B8, and B9 have clockwise polarization. As noted above, beams of the same frequency may overlap without interference provided they are distinguished by their polarizations.

Figure 3:
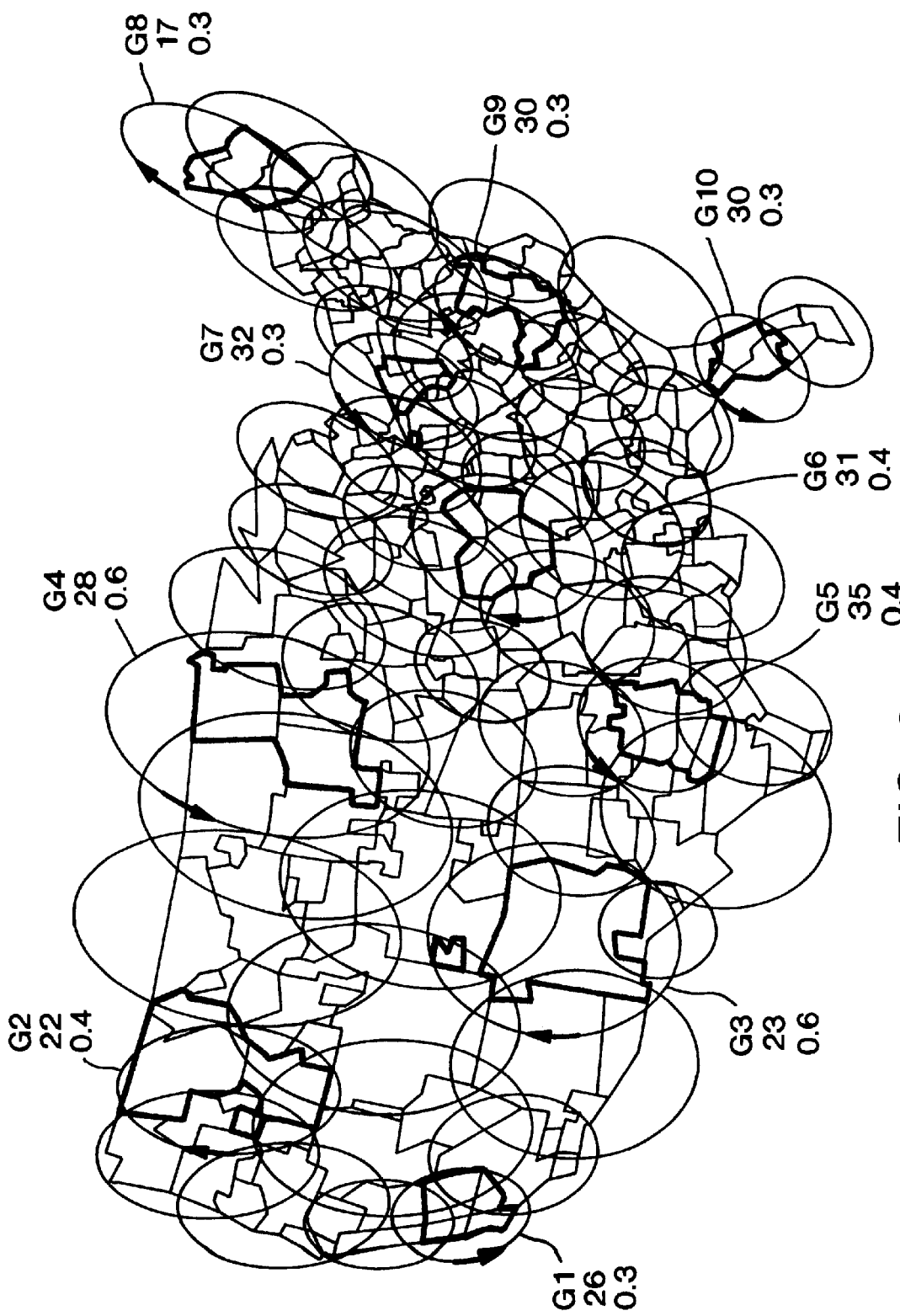
FIG. 3 shows the projection of a subset of beams shown in FIG. 1 that represents a particular frequency, labeled 'G'.
Figure 4:
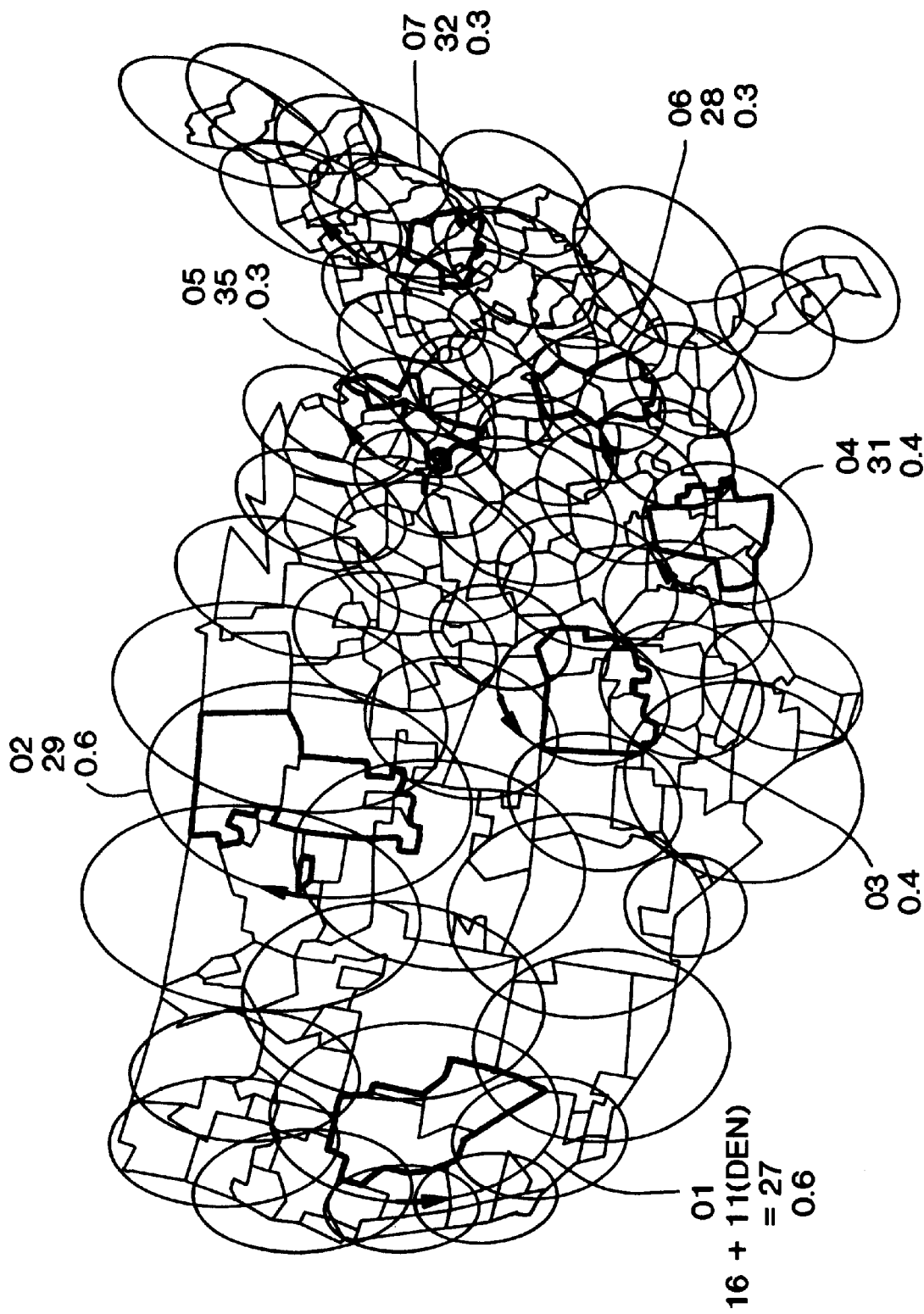
FIG. 4 shows the projection of a subset of beams shown in FIG. 1 that represents a particular frequency, labeled 'O'.
Figure 5:
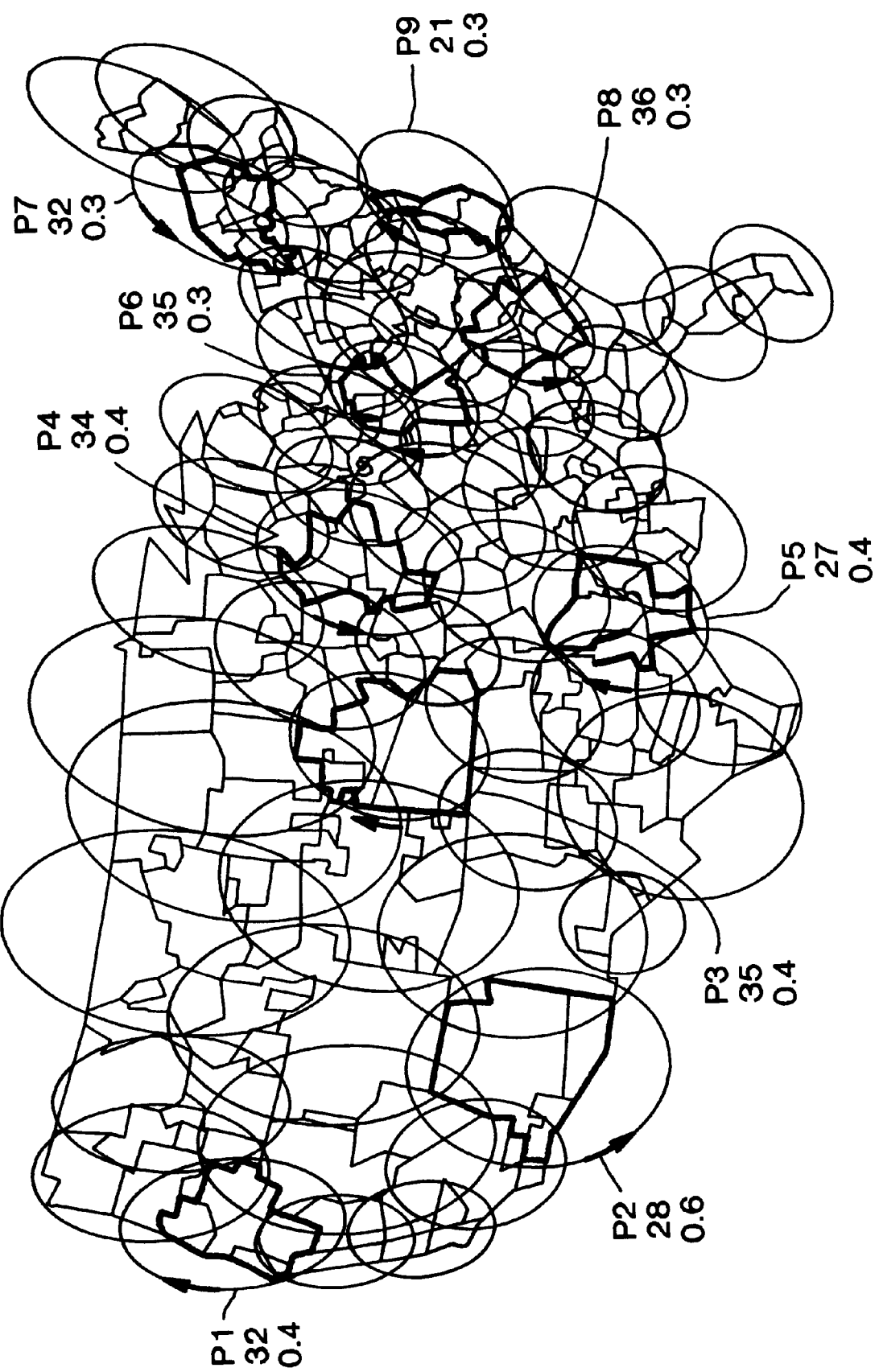
FIG. 5 shows the projection of a subset of beams shown in FIG. 1 that represents a particular frequency, labeled 'P'.
Figure 6:
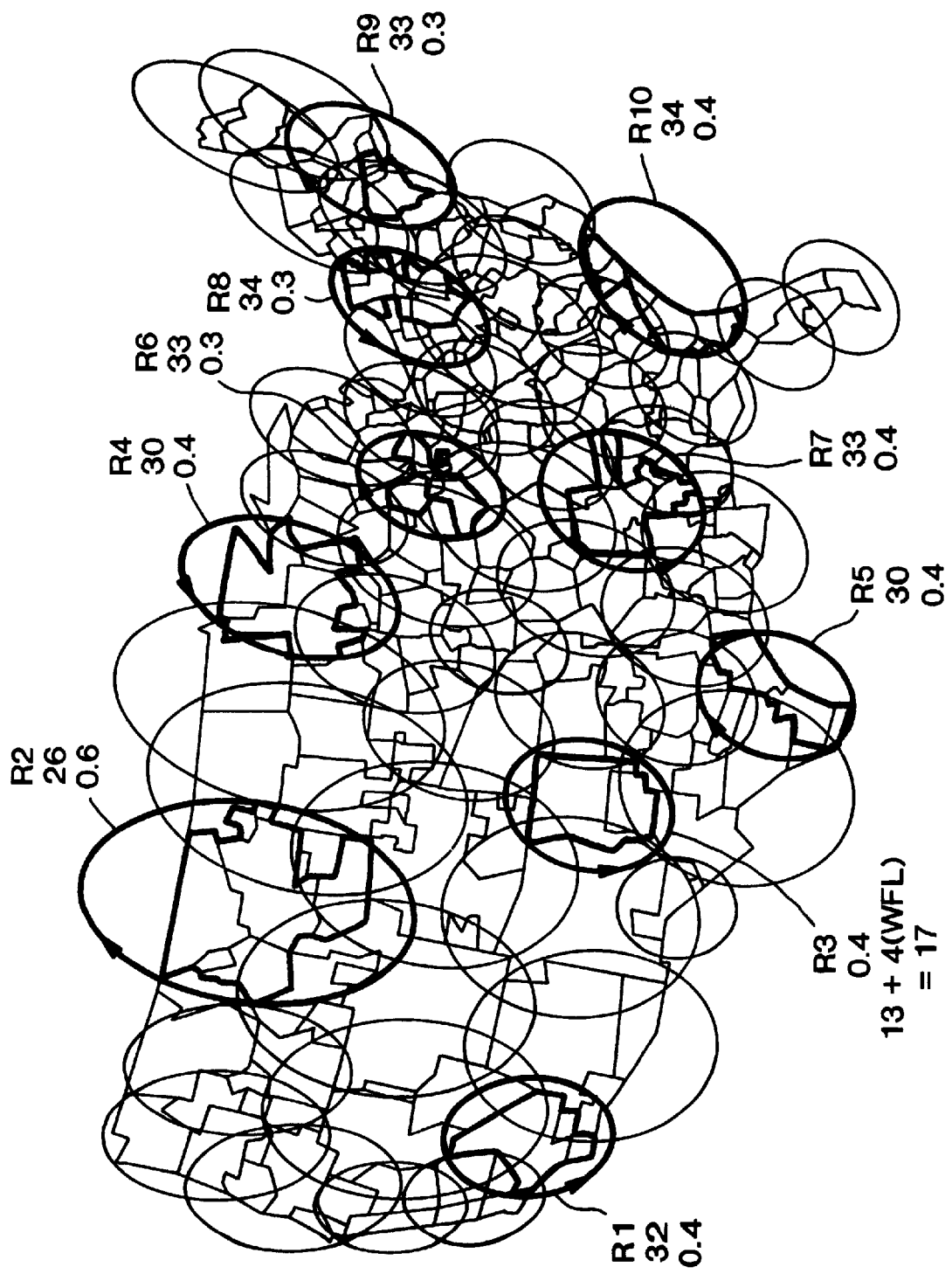
FIG. 6 shows the projection of a subset of beams shown in FIG. 1 that represents a particular frequency, labeled 'R'.
Figure 7:
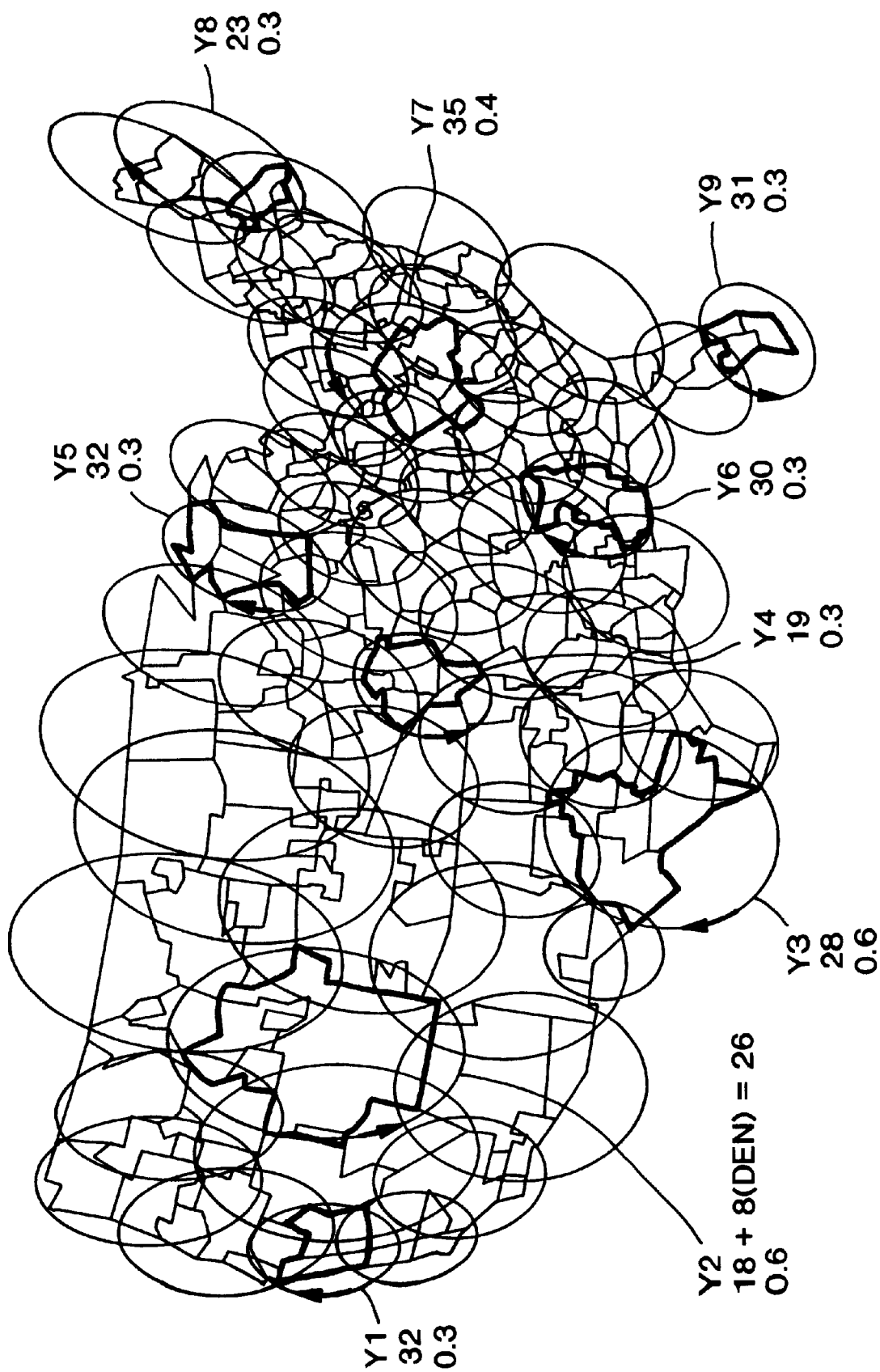
FIG. 7 shows the projection of a subset of beams shown in FIG. 1 that represents a particular frequency, labeled 'Y'.

FIGS. 3–7 illustrate projections of beams of five other frequencies (G, FIG. 3; O, FIG. 4; P, FIG. 5; R, FIG. 6; and Y, FIG. 7) over the United States. In conjunction with the beams shown in FIG. 2, the beams shown in FIGS. 3–7 provide bandwidth for the United States. The properties of the beams, including the number of Nielsen television stations each beam covers, are summarized below in Table 1:

TABLE 1

| Beam | Size (half angle) | Polarization CCW = Counter Clockwise CW = Clockwise | Nielsen stations |
|---|---|---|---|
| B1 | 0.4 | CCW | 32 |
| B2 | 0.6 | CW | 25 |
| B3 | 0.3 | CCW | 13 |
| B4 | 0.4 | CCW | 26 |
| B5 | 0.4 | CW | 25 |
| B6 | 0.3 | CW | 35 |
| B7 | 0.3 | CCW | 26 |

TABLE 1-continued

| Beam | Size (half angle) | Polarization CCW = Counter Clockwise CW = Clockwise | Nielsen stations |
|---|---|---|---|
| B8 | 0.3 | CW | 32 |
| B9 | 0.3 | CW | 33 |
| G1 | 0.3 | CCW | 26 |
| G2 | 0.4 | CW | 22 |
| G3 | 0.6 | CW | 23 |
| G4 | 0.6 | CCW | 28 |
| G5 | 0.4 | CCW | 35 |
| G6 | 0.4 | CW | 31 |
| G7 | 0.3 | CCW | 32 |
| G8 | 0.3 | CW | 17 |
| G9 | 0.3 | CW | 30 |
| G10 | 0.3 | CCW | 30 |
| O1 | 0.6 | CCW | 27 |
| O2 | 0.6 | CW | 29 |
| O3 | 0.4 | CCW | 31 |
| O4 | 0.4 | CW | 31 |
| O5 | 0.3 | CW | 35 |
| O6 | 0.3 | CCW | 28 |
| O7 | 0.3 | CW | 32 |
| P1 | 0.4 | CW | 32 |
| P2 | 0.6 | CCW | 28 |
| P3 | 0.4 | CW | 35 |
| P4 | 0.4 | CCW | 34 |
| P5 | 0.4 | CW | 27 |
| P6 | 0.3 | CW | 35 |
| P7 | 0.3 | CCW | 32 |
| P8 | 0.3 | CCW | 36 |
| P9 | 0.3 | CW | 21 |
| R1 | 0.4 | CCW | 32 |
| R2 | 0.6 | CW | 26 |
| R3 | 0.4 | CCW | 17 |
| R4 | 0.4 | CCW | 30 |
| R5 | 0.4 | CW | 30 |
| R6 | 0.3 | CW | 33 |
| R7 | 0.4 | CCW | 33 |
| R8 | 0.3 | CCW | 34 |
| R9 | 0.3 | CW | 33 |
| R10 | 0.4 | CW | 34 |
| Y1 | 0.3 | CW | 32 |
| Y2 | 0.6 | CCW | 26 |
| Y3 | 0.6 | CW | 28 |
| Y4 | 0.3 | CCW | 19 |
| Y5 | 0.3 | CW | 32 |
| Y6 | 0.3 | CW | 30 |
| Y7 | 0.4 | CCW | 35 |
| Y8 | 0.3 | CW | 23 |
| Y9 | 0.3 | CCW | 31 |

Generally, beams with smaller half angles are projected on areas of higher bandwidth density (generally areas with a higher population density). Thus, the bandwidth needs of a particular region, for example the Eastern United States, may be covered by a series of small half angle beams. Assigning a small half angle beam to a highly populated area allows a single beam to dedicate its entire bandwidth to the large population in that area, thereby minimizing the possibility that the bandwidth demands of the area will exceed the capacity of the beam.

A smaller number of larger half angle beams may cover areas in a ROI that have relatively low bandwidth density. For example, the bandwidth demands of certain portions of the sparsely populated Western United States can be met with a reduced number of larger half angle beams. Because the bandwidth density tends to be lower across sparsely populated areas, a reduced number of larger half angle beams may be used to cover large areas while meeting the bandwidth demands for those areas.

Beams of any particular size are not limited to projection on areas of any particular bandwidth density or population density, however, because other design choices may dictate which size beams are projected to which areas. In most instances, however, the bandwidth demands of a particular ROI can be met efficiently by projection larger half angle beams on areas of low bandwidth demand and projecting smaller half angle beams on areas of high bandwidth demands.

Figure 8:
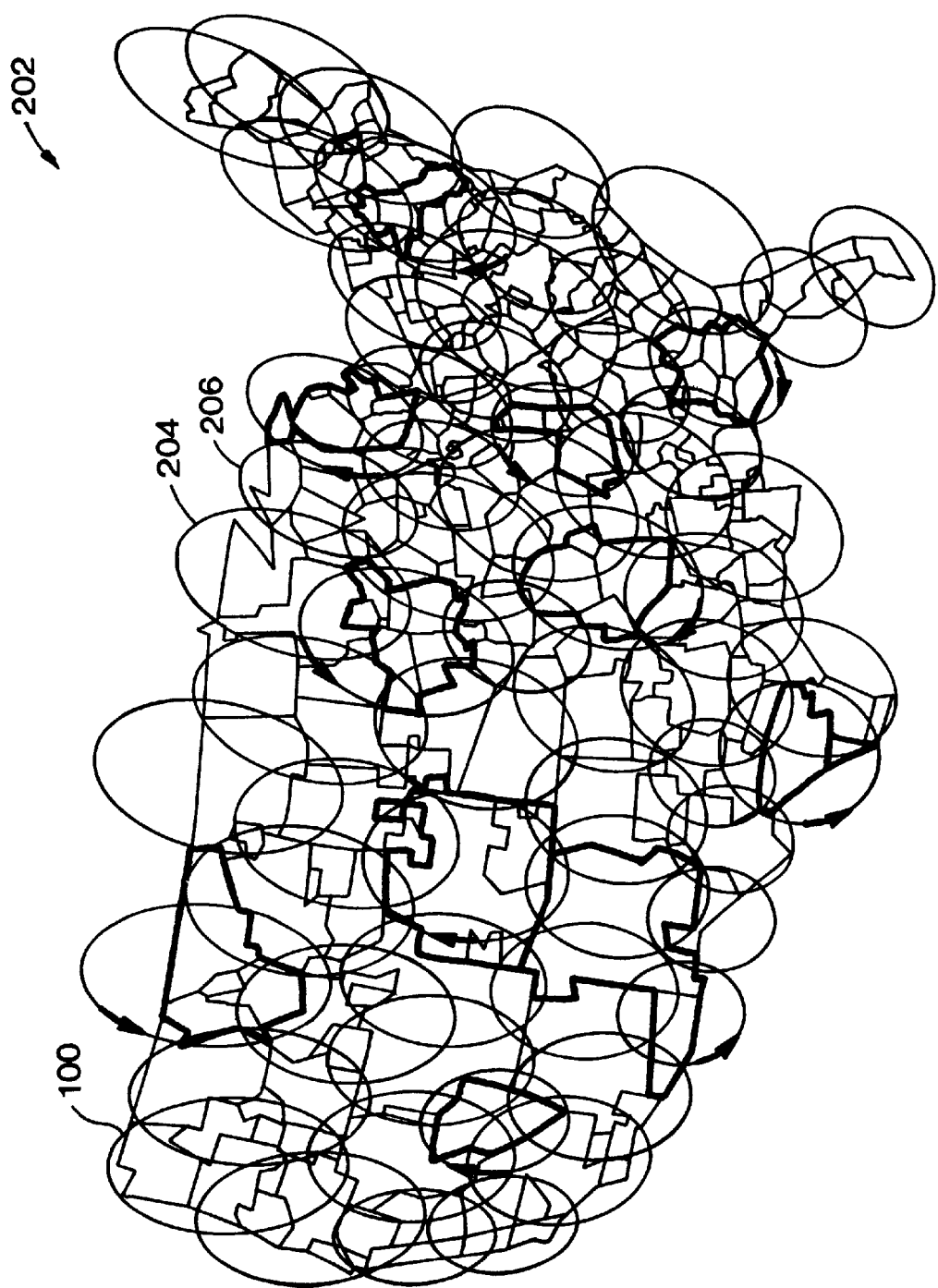
FIG. 8 illustrates a projection of beams of two different sizes, two polarizations, and six different frequencies that provides communication bandwidth across the United States.
Figure 9:
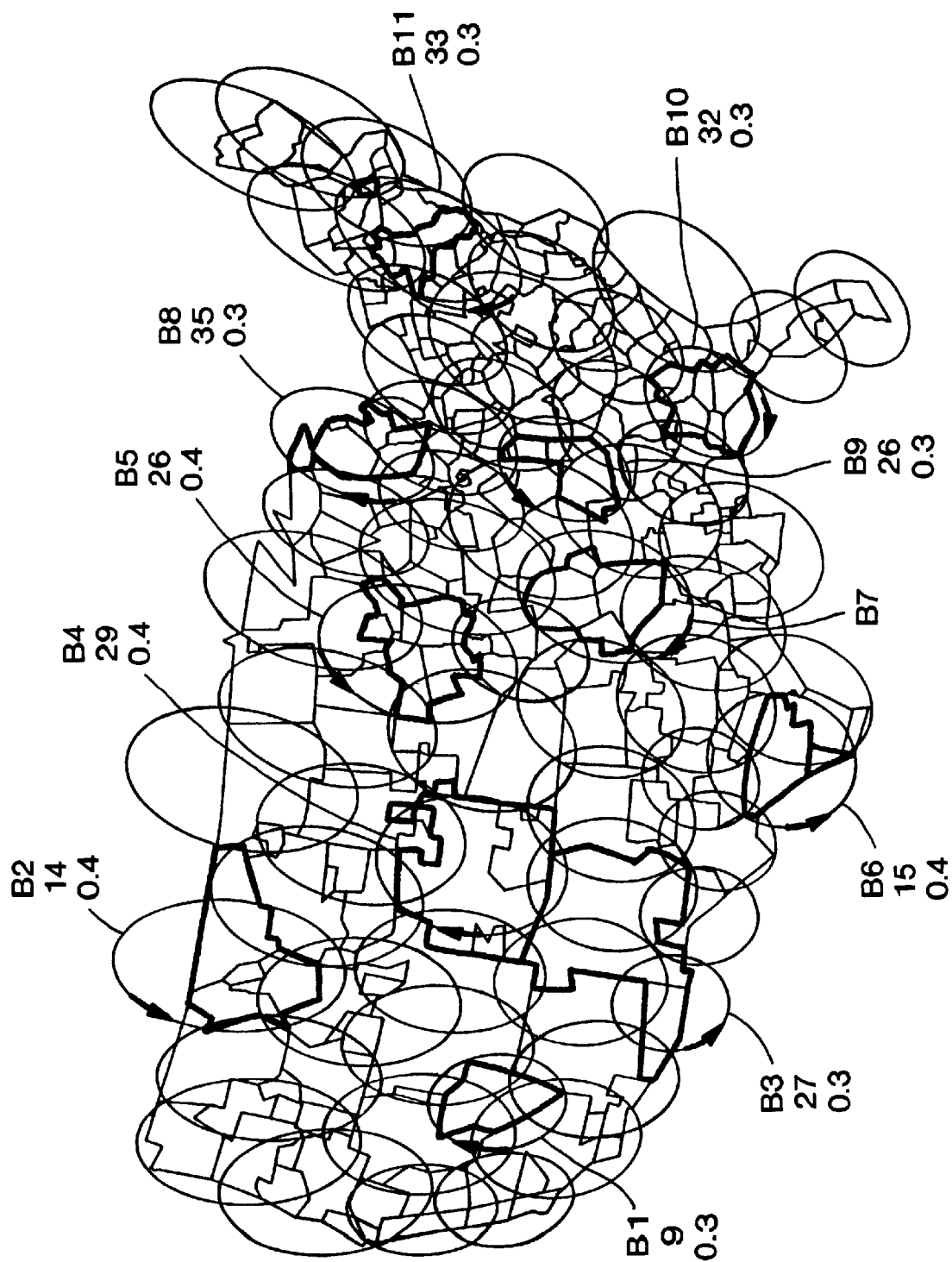
FIG. 9 shows the projection of a subset of beams shown in FIG. 8 that is represents a particular frequency, labeled 'B'.
Figure 10:
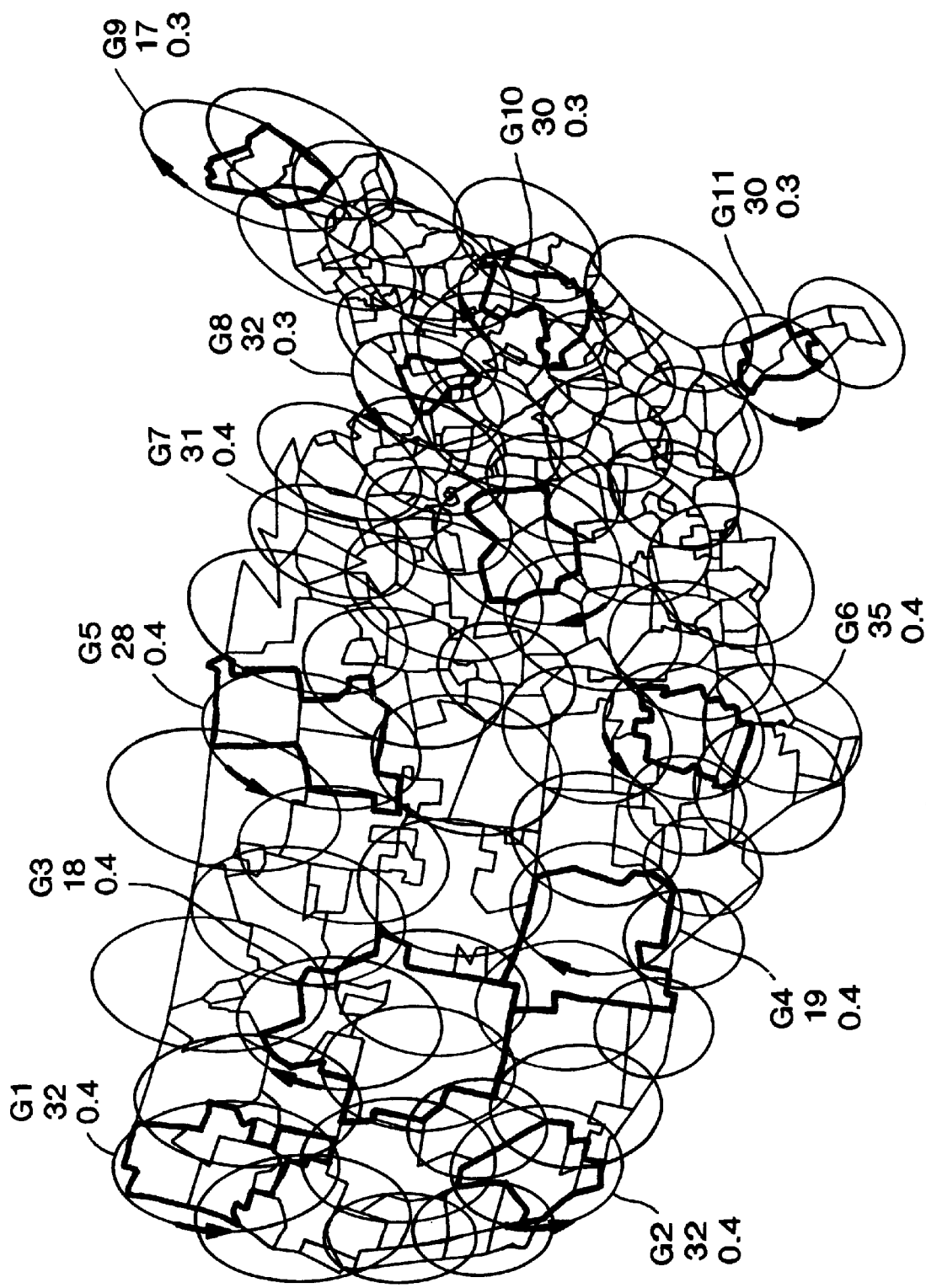
FIG. 10 shows the projection of a subset of beams shown in FIG. 8 that represents a particular frequency, labeled 'G'.
Figure 11:
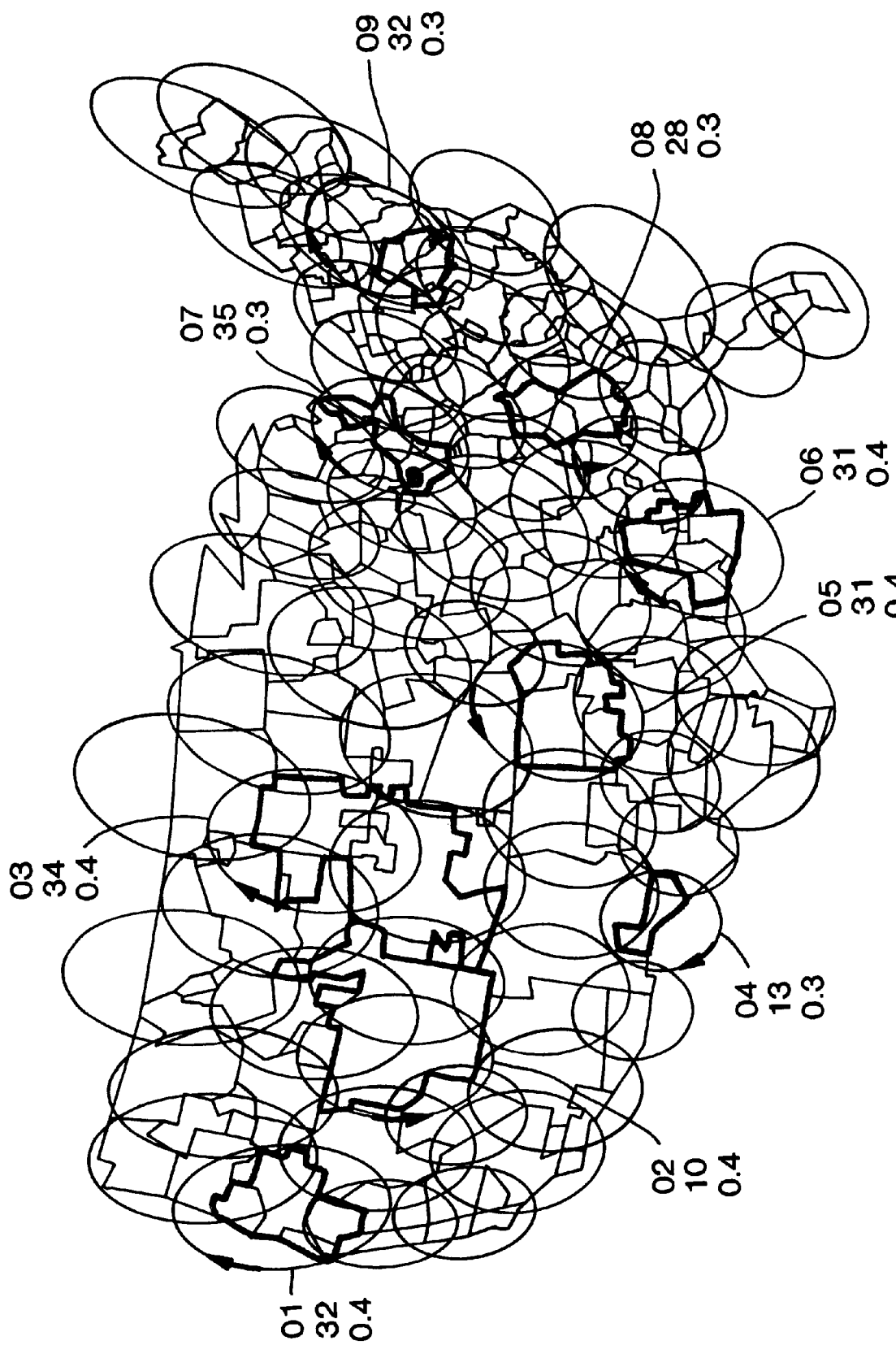
FIG. 11 shows the projection of a subset of beams shown in FIG. 8 that represents a particular frequency, labeled 'O'.
Figure 12:
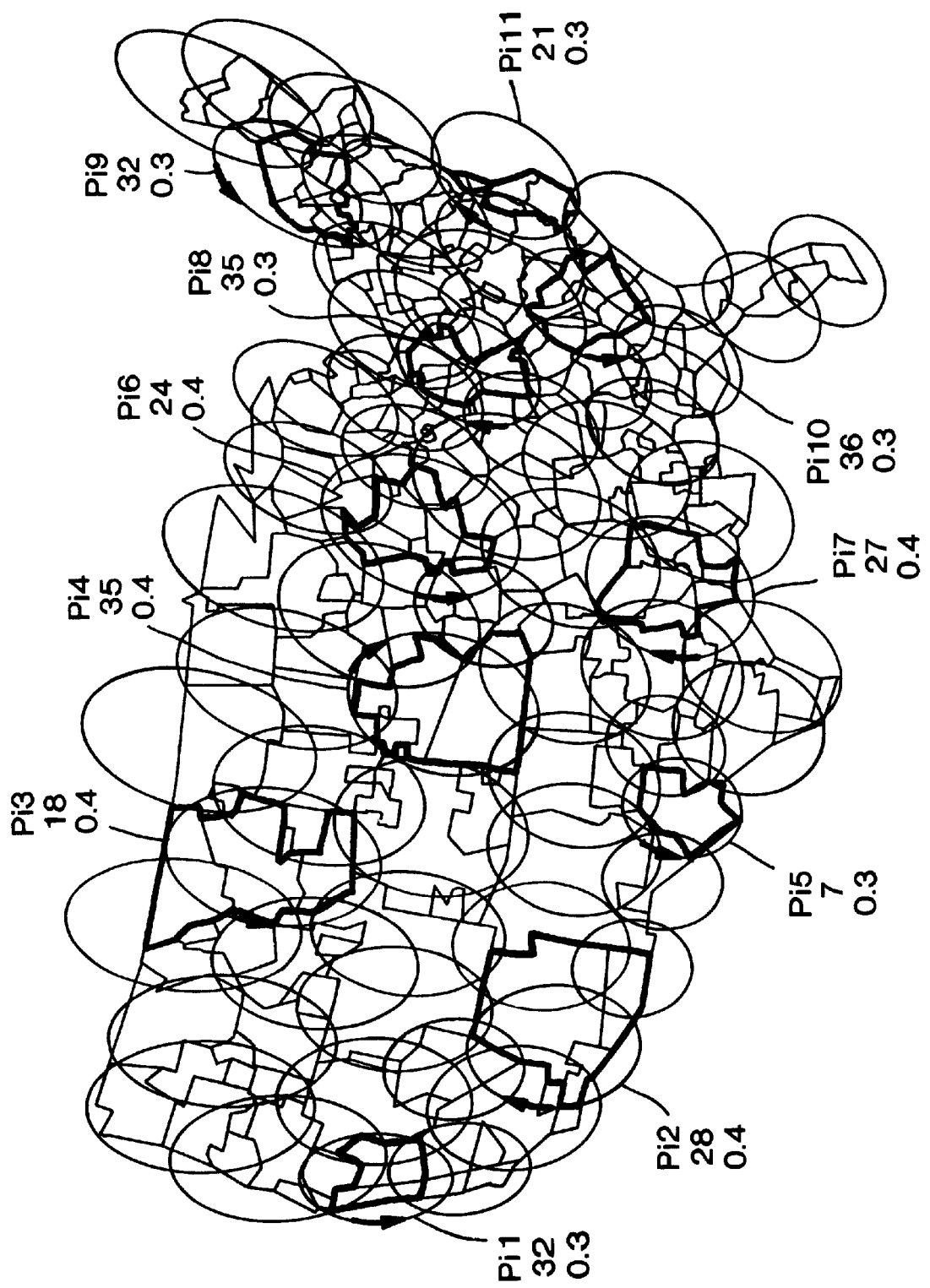
FIG. 12 shows the projection of a subset of beams shown in FIG. 8 that represents a particular frequency, labeled 'Pi'.
Figure 13:
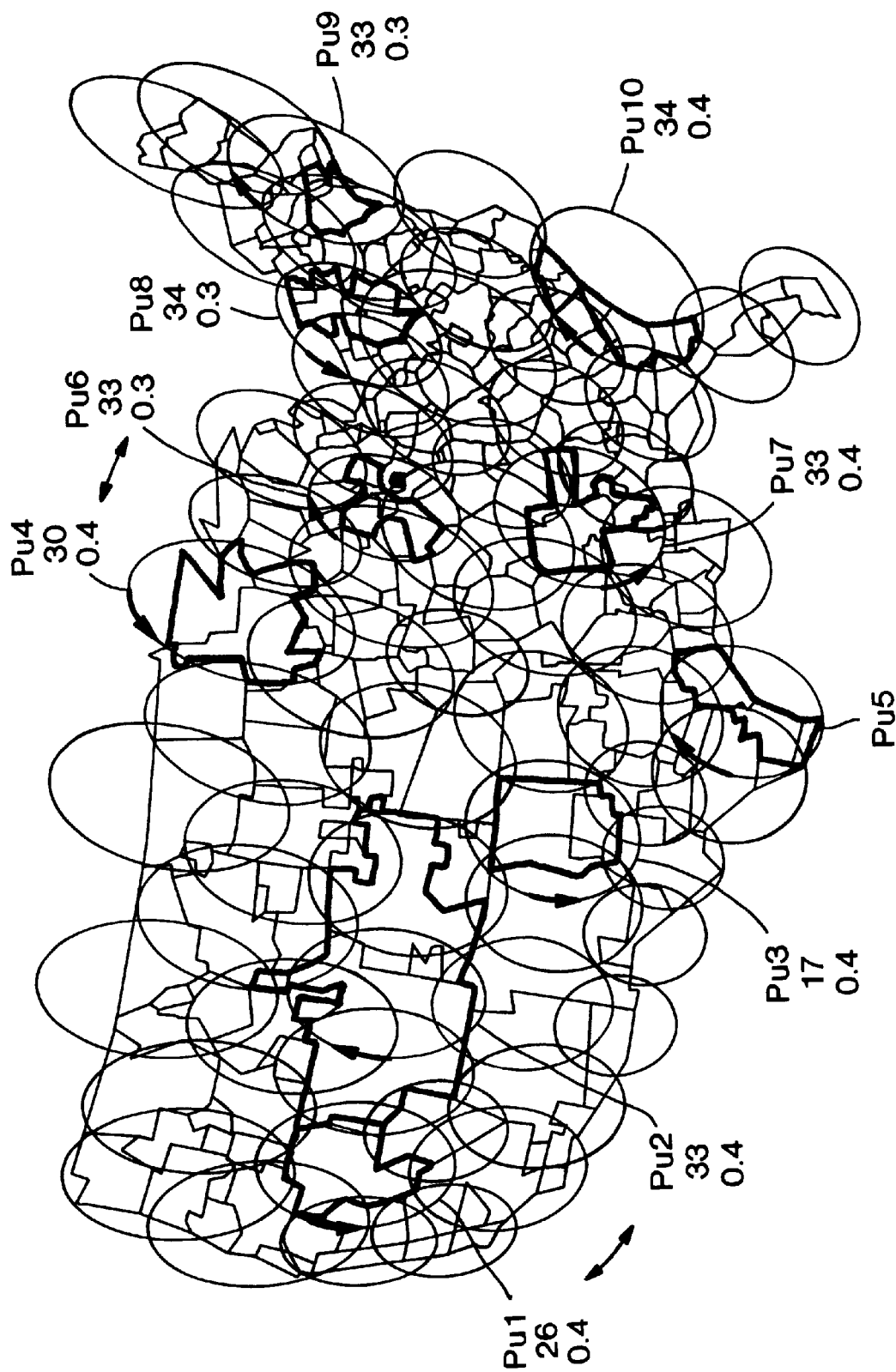
FIG. 13 shows the projection of a subset of beams shown in FIG. 8 that represents a particular frequency, labeled 'Pu'.
Figure 14:
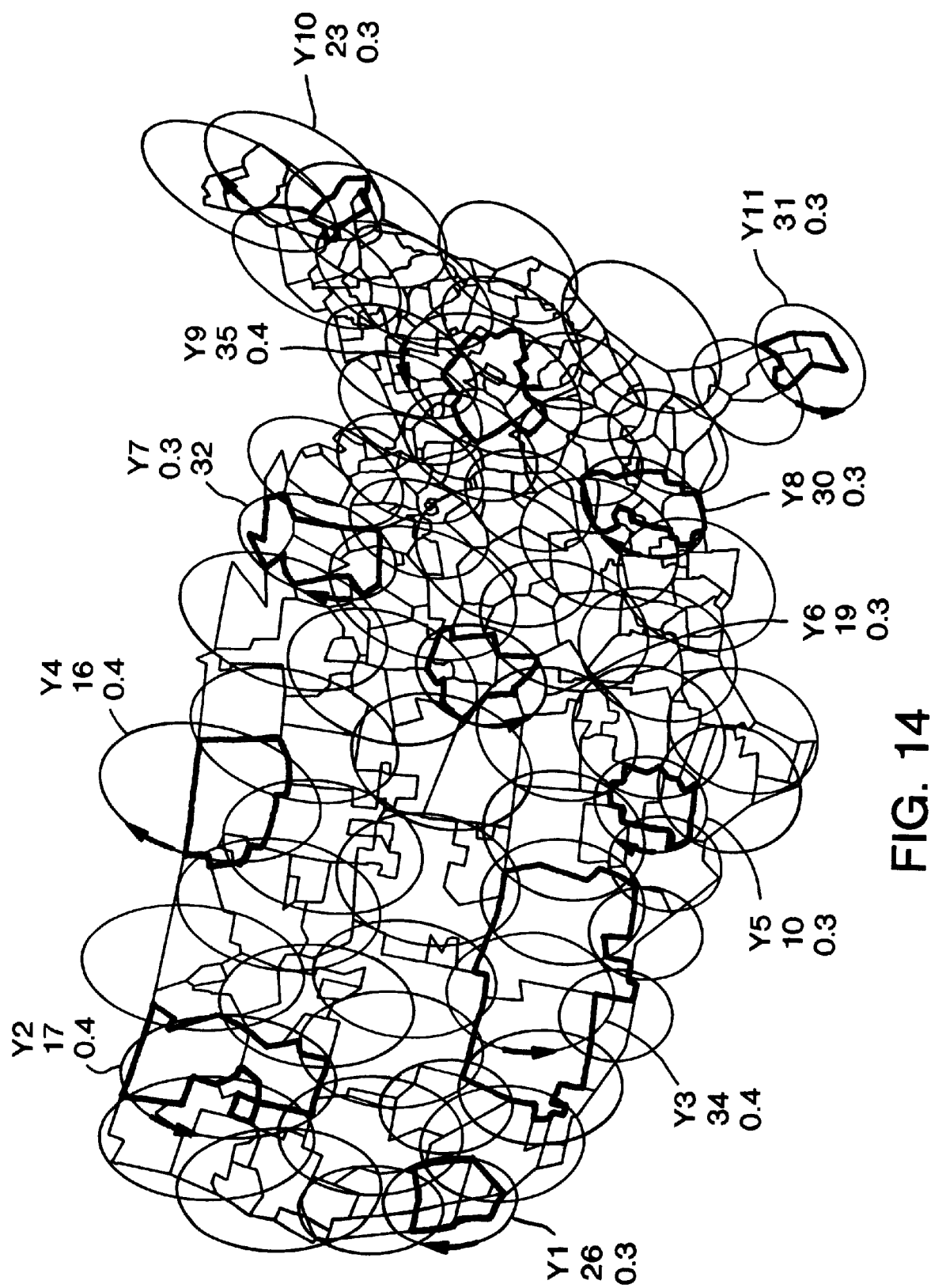
FIG. 14 shows the projection of a subset of beams shown in FIG. 8 that represents a particular frequency, labeled 'Y'.

Referring again to FIG. 1–7, it is noted that the beams need not be aligned on a grid or any other regular pattern. Thus, bandwidth may be directed toward the areas that actually require the bandwidth, and not, for example, to areas that simply correspond to a grid point. Furthermore, it is not required that three beam sizes be used to cover the United States or any other ROI. A larger or smaller number of beam sizes may be used as well. FIG. 8, for example, shows a projection of beams 202 of two different sizes (for example, beam 204 and beam 206), two polarizations, and six different frequencies (labeled B, G, O, Pi, Pu, and Y) that provides communication bandwidth across the United States. FIGS. 9–14 illustrate the size, polarization, and frequency of the beams (B, FIG. 9; G, FIG. 10; O, FIG. 11; Pi, FIG. 12; Pu, FIG. 13; and Y, FIG. 14) which are included in the projection shown in FIG. 8 over the United States. The properties of the beams, including the number of Nielsen television stations each beam covers, are summarized below in Table 2:

TABLE 2

| Beam | Size (half angle) | Polarization CCW = Counter Clockwise CW = Clockwise | Nielsen stations |
|---|---|---|---|
| B1 | 0.3 | CW | 9 |
| B2 | 0.4 | CCW | 14 |
| B3 | 0.3 | CCW | 27 |
| B4 | 0.4 | CW | 29 |
| B5 | 0.4 | CCW | 26 |
| B6 | 0.4 | CCW | 15 |
| B7 | 0.4 | CW | |
| B8 | 0.3 | CW | 35 |
| B9 | 0.3 | CCW | 26 |
| B10 | 0.3 | CW | 32 |
| B11 | 0.3 | CW | 33 |
| G1 | 0.4 | CCW | 32 |
| G2 | 0.4 | CCW | 32 |
| G3 | 0.4 | CW | 18 |
| G4 | 0.4 | CW | 19 |
| G5 | 0.4 | CCW | 28 |
| G6 | 0.4 | CCW | 35 |
| G7 | 0.4 | CW | 31 |
| G8 | 0.3 | CCW | 32 |
| G9 | 0.3 | CW | 17 |
| G10 | 0.3 | CW | 30 |
| G11 | 0.3 | CCW | 30 |
| O1 | 0.4 | CW | 32 |
| O2 | 0.4 | CCW | 10 |
| O3 | 0.4 | CW | 34 |
| O4 | 0.3 | CW | 13 |
| O5 | 0.4 | CCW | 31 |
| O6 | 0.4 | CW | 31 |
| O7 | 0.3 | CW | 35 |
| O8 | 0.3 | CCW | 28 |
| O9 | 0.3 | CW | 32 |
| PI1 | 0.3 | CCW | 32 |
| PI2 | 0.4 | CW | 28 |
| PI3 | 0.4 | CCW | 18 |
| PI4 | 0.4 | CW | 35 |
| PI5 | 0.3 | CCW | 7 |
| PI6 | 0.4 | CCW | 24 |
| PI7 | 0.4 | CW | 27 |
| PI8 | 0.3 | CW | 35 |
| PI9 | 0.3 | CCW | 32 |
| Pi10 | 0.3 | CCW | 36 |
| Pi11 | 0.3 | CW | 21 |
| Pu1 | 0.4 | CCW | 26 |

TABLE 2-continued

| Beam | Size (half angle) | Polarization CCW = Counter Clockwise CW = Clockwise | Nielsen stations |
|---|---|---|---|
| Pu2 | 0.4 | CW | 33 |
| Pu3 | 0.4 | CCW | 17 |
| Pu4 | 0.4 | CCW | 30 |
| Pu5 | 0.4 | CW | |
| Pu6 | 0.3 | CW | 33 |
| Pu7 | 0.4 | CCW | 33 |
| Pu8 | 0.3 | CCW | 34 |
| Pu9 | 0.3 | CW | 33 |
| Pu10 | 0.4 | CW | 34 |
| Y1 | 0.3 | CW | 26 |
| Y2 | 0.4 | CCW | 17 |
| Y3 | 0.4 | CCW | 34 |
| Y4 | 0.4 | CW | 16 |
| Y5 | 0.3 | CW | 10 |
| Y6 | 0.3 | CCW | 19 |
| Y7 | 0.3 | CW | 32 |
| Y8 | 0.3 | CW | 30 |
| Y9 | 0.4 | CCW | 35 |
| Y10 | 0.3 | CW | 23 |
| Y11 | 0.3 | CCW | 31 |

While particular elements, embodiments and applications of the present invention have been shown and described, it will be understood, of course, that the invention is not limited thereto since modifications may be made by those skilled in the art, particularly in light of the foregoing instruction. It is therefore contemplated by the appended claims to cover such modifications as incorporate those features which come within the spirit and scope of the invention.

What is claimed is:

1. A method of generating a beam pattern covering a region of interest, said method comprising:
   a) generating a first set of polarized beams having a first size, each beam in said first set of polarized beams occupying a portion of a frequency spectrum;
   b) generating second set of polarized beams having a second size, each beam in said second set of polarized beams occupying a portion of the frequency spectrum;
   c) projecting said first set of polarized beams and said second set of polarized beams in an irregular pattern onto a region of interest to create a beam pattern of projected beams having at least two overlapping projected beams, each of said projected beams being non-interfering with any adjacent projected beam; and wherein said first size and said second size lie in the range of approximately 0.3 to 0.6 degree half angles.

2. A method of generating a beam pattern covering a region of interest, said method comprising the steps of:
   a) generating a first set of beams having a first size in the range of approximately 0.3 to 0.6 degrees half angle, each beam in said first set of beams occupying a portion of a frequency spectrum;
   b) generating a second set of beams having a second size in the range of approximately 0.3 to 0.6 degrees half angle, each beam in said second set of beams occupying a portion of the frequency spectrum; and
   c) projecting said first set of beams and said second set of beams in an irregular pattern onto a region of interest to create a beam pattern of projected beams having at least two overlapping projected beams, each of said projected beams being substantially non-interfering with any adjacent projected beam.

3. The method of claim 2 wherein said projecting step further comprises projecting at least one beam in said second set of beams onto an area of said region of interest having a bandwidth density below a predetermined threshold.

4. The method of claim 2 wherein said first size is smaller than said second size and said projecting step further comprises projecting at least one beam in said first set of beams onto an area of said region of interest having a bandwidth density approximately above a predetermined threshold.

5. The method of claim 2, wherein each of said projected beams occupies a portion of the Ka frequency band.

6. The method of claim 2 further comprising the step of generating at least one additional set of beams having at least one additional size, each beam in said at least one additional set of beams occupying a portion of the frequency spectrum; and wherein said projecting step further comprises projecting said at least one additional set of, polarized beams onto said region of interest.

7. The method of claim 6 wherein each of said first, second, and additional beams occupies a portion of the Ka frequency band.

8. The method of claim 7, wherein said projecting step uses an MBA antenna on said satellite.

9. The method of claim 7, wherein said projecting step uses a phased array antenna on said satellite.

10. A beam pattern for providing communication bandwidth for a region of interest, the beam pattern comprising a projection onto the region of interest of a plurality of first sized beams overlapping a plurality of larger second sized beams and a plurality of third sized beams larger in size than the first sized beams and overlapping the first sized beams and the second sized beams, the first sized beams projected onto first areas of the region of interest, the second sized beams projected onto second areas of the region of interest, wherein the first areas have bandwidth densities greater than those of the second areas.

11. The beam pattern of claim 10, wherein the first areas have a population density greater than that of the second areas.

12. The beam pattern of claim 10, wherein the first sized beams and the second sized beams are polarized.

13. A beam pattern for providing communication bandwidth for a region of interest, the beam pattern comprising a projection onto the region of interest of a plurality of first sized beams overlapping a plurality of larger second sized beams, the first sized beams projected onto first areas of the region of interest, the second sized beams projected onto second areas of the region of interest, wherein the first areas have bandwidth densities greater than those of the second areas and wherein said first size beams and said second sized beams are between approximately 0.3 to 0.4 degree half angle in size.

14. The beam pattern of claim 13, wherein each of the first sized beams, each of the second sized beams, and each of the third sized beams occupy one of at least six different frequencies, and the region of interest is the continental United States.

* * * * *